US010851575B2

(12) United States Patent
Takahashi (10) Patent No.: US 10,851,575 B2
(45) Date of Patent: Dec. 1, 2020

(54) HOLDER-EQUIPPED WINDOW GLASS AND PROCESS FOR ITS PRODUCTION

(71) Applicant: AGC INC., Tokyo (JP)

(72) Inventor: Kazuhiro Takahashi, Tokyo (JP)

(73) Assignee: AGC INC., Tokyo (JP)

( * ) Notice: Subject to any disclaimer, the term of this patent is extended or adjusted under 35 U.S.C. 154(b) by 105 days.

(21) Appl. No.: 16/201,171

(22) Filed: Nov. 27, 2018

(65) Prior Publication Data

US 2019/0178019 A1 Jun. 13, 2019

(30) Foreign Application Priority Data

Dec. 8, 2017 (JP) ................................ 2017-236133

(51) Int. Cl.
*B60J 1/16* (2006.01)
*E05F 11/38* (2006.01)
(Continued)

(52) U.S. Cl.
CPC .............. *E05F 11/385* (2013.01); *B60J 1/17* (2013.01); *E05D 15/165* (2013.01);
(Continued)

(58) Field of Classification Search
CPC ....... E05F 11/385; B60J 1/17; E05Y 2800/68; E05Y 2800/205; E05Y 2800/20; E05Y 2800/678; E05Y 2900/55; B29C 45/00
(Continued)

(56) References Cited

U.S. PATENT DOCUMENTS 4,118,266 A * 10/1978 Kerr .................... E06B 3/26336
156/293
4,987,699 A * 1/1991 Gold ......................... B60J 1/17
156/107
(Continued)

FOREIGN PATENT DOCUMENTS

JP         58000417 A  *  1/1983  ................ B60J 1/17
JP       2001-039155 A     2/2001
(Continued)

OTHER PUBLICATIONS

Extended European Search Report in corresponding European Appl. Ser. No. 18210023.0, dated May 14, 2019.

*Primary Examiner* — Jerry E Redman
(74) *Attorney, Agent, or Firm* — Foley & Lardner LLP (57) ABSTRACT

To provide a holder-equipped window glass capable of increasing the quality and productivity and capable of preventing breakage of the window glass to be caused by attachment of the holder, and a process for its production. A holder main body 18 is an integrally molded product comprising an inner layer portion 26 and an outer layer portion 28. The inner layer portion 26 is constructed to be U-shaped in cross section to clamp a part of a lower edge 12B of a window glass 12 in the thickness direction of the lower edge 12B. Further, the outer layer portion 28 is located outside the inner layer portion 26, is made of a material harder than the inner layer portion 26 and is constructed to be U-shaped in cross section. This outer layer portion 28 is provided with a connecting portion 16. This connection portion 16 is projecting in a direction departing form the lower edge 12B of the window glass 12.

8 Claims, 5 Drawing Sheets

(51) Int. Cl.
 *B60J 1/17* (2006.01)
 *E05D 15/16* (2006.01)

(52) U.S. Cl.
 CPC ..... *E05Y 2800/20* (2013.01); *E05Y 2800/205* (2013.01); *E05Y 2800/46* (2013.01); *E05Y 2800/678* (2013.01); *E05Y 2800/68* (2013.01); *E05Y 2800/682* (2013.01); *E05Y 2900/55* (2013.01)

(58) Field of Classification Search
 USPC .......................................................... 49/375
 See application file for complete search history.

(56) References Cited

U.S. PATENT DOCUMENTS

| | | | | |
|---|---|---|---|---|
| 5,050,348 A * | 9/1991 | Kane | ........................ | B60J 1/17 49/351 |
| 5,765,310 A * | 6/1998 | Gold | ........................ | B60J 1/17 49/375 |
| 6,044,589 A * | 4/2000 | Dallos, Jr. | ............ | E05F 11/445 49/375 |
| 6,170,197 B1 * | 1/2001 | Tyves | ................... | E05F 11/385 49/358 |
| 6,494,003 B1 * | 12/2002 | Kawase | ................... | C08J 5/124 156/106 |
| 8,146,645 B2 * | 4/2012 | Pulcini | ................. | E05F 11/385 156/538 |
| 10,323,448 B2 * | 6/2019 | Koette | .................. | E05F 11/385 |
| 10,576,808 B2 * | 3/2020 | Morita | ................. | C03C 17/009 |
| 2002/0073622 A1 * | 6/2002 | Davis | .................... | E05F 11/426 49/349 |
| 2003/0089055 A1 * | 5/2003 | Kawase | .................. | C08J 5/124 52/204.62 |
| 2003/0093960 A1 * | 5/2003 | Mizusawa | ............ | E05F 11/385 52/204.62 |
| 2003/0196384 A1 * | 10/2003 | Kang | .................... | E05F 11/385 49/375 |
| 2009/0072579 A1 * | 3/2009 | Mori | ..................... | E05F 11/385 296/146.1 |
| 2010/0037543 A1 * | 2/2010 | Pulcini | ................. | E05F 11/385 52/208 |
| 2018/0094468 A1 * | 4/2018 | Stewart | ................ | E05D 15/165 |
| 2018/0264918 A1 * | 9/2018 | Walawender | ........ | E05F 11/385 |

FOREIGN PATENT DOCUMENTS

| | | | |
|---|---|---|---|
| JP | 2008-105416 | A | 5/2008 |
| JP | 2015-533113 | A | 11/2015 |
| JP | 2015-214817 | A | 12/2015 |

* cited by examiner

HOLDER-EQUIPPED WINDOW GLASS AND PROCESS FOR ITS PRODUCTION

TECHNICAL FIELD

The present invention relates to a holder-equipped window glass and a process for its production.

BACKGROUND ART

A window glass mounted on a vehicle door so as to be vertically movable up and down is connected to a lifting and lowering device (referred to also as a "regulator") disposed inside of a door panel and designed to be moved up and down by a driving force from the lifting and lowering device. The lifting and lowering device includes a driving source and a power transmission member to transmit the power of the driving source to the window glass. On the other hand, the window glass has a holder attached to a part of its lower edge, and to a connecting portion of this holder, the power transmission member is to be connected.

Patent Document 1 discloses use of an urethane type adhesive as a method for attaching a holder to a window glass, i.e. as a method for producing a holder-equipped window glass. Further, Patent Document 1 discloses that as the material for the holder, an engineering plastic such as a polyester resin, a polyamide resin or a polyacetal resin is suitable.

On the other hand, Patent Document 2 discloses forming a hole by drilling at a lower edge portion of a window glass and passing a nut, a rivet or the like through this hole to attach a holder, as a method for producing a holder (U-shaped bracket)-equipped window glass.

PRIOR ART DOCUMENTS

Patent Documents

Patent Document 1: JP-A-2015-214817
Patent Document 2: JP-A-2015-533113

DISCLOSURE OF INVENTION

Technical Problem

However, the holder-equipped window glass and the method for its production as disclosed in Patent Document 1 had the following problems and concerns.

That is, in the method for producing a holder-equipped window glass in Patent Document 1, an urethane type adhesive is used, whereby it takes time (from 24 to 48 hours) for curing. Thus, an aging time for curing the adhesive is required separately from the time for attaching the holder to the window glass, whereby there was a problem that the productivity of the holder-equipped window glass was poor. Further, in the production method in Patent Document 1, there was a concern that the holder may undergo displacement in position relative to the window glass due to an external force, etc. during the above-mentioned aging. The attachment position of the holder to the glass window is required to be highly precise in connection to the lifting and lowering device. Thus, there was a concern that the production method of Patent Document 1 may present an influence over the quality of the holder equipped window glass. Still further, the holder-equipped window glass in Patent Document 1 had a concern that the holder may peel from the window glass due to the difference in the linear expansion coefficient between the window glass made of glass and the holder made of a hard resin (an engineering plastic). Thus, the holder-equipped window glass and the method for its production in Patent Document 1 had problems with respect to the quality and productivity.

On the other hand, the holder-equipped window glass in Patent Document 2 has such a construction that the holder is mechanically attached to a hole of the window glass, whereby it is free from the above-mentioned problems of Patent Document 1. However, in the holder-equipped window glass in Patent Document 2, there was a concern that if a stress is exerted to the periphery of the hole, the window glass may be broken starting from a fine crack formed at the periphery of the hole.

The present invention has been made under these circumstances and has an object to provide a holder-equipped window glass capable of increasing the quality and productivity and at the same time, capable of preventing breakage of the window glass caused by attachment of the holder, and a process for its production.

Solution to Problem

In order to accomplish the object of the present invention, the holder-equipped window glass of the present invention is a holder-equipped window glass including a window glass mounted on a vehicle door so as to be vertically movable up and down, and a holder attached to a part of a lower edge of the window glass and having a connecting portion to be connected to a lifting and lowering device for the window glass, wherein said holder is an integrally molded product including an inner layer portion and an outer layer portion, said inner layer portion is U-shaped in cross-section to clamp a part of the lower edge of the window glass in the thickness direction of the lower edge, said outer layer portion is located outside said inner layer portion, is made of a material harder than said inner layer portion and is U-shaped in cross section, and said outer layer portion has said connecting portion projecting in a direction departing from the lower edge of the window glass.

In order to accomplish the object of the present invention, the process for producing a holder-equipped window glass of the present invention is a process for producing a holder-equipped window glass including a window glass mounted on a vehicle door so as to be vertically movable up and down, and a holder attached to a part of a lower edge of the window glass and having a connecting portion to be connected to a lifting and lowering device for the window glass, said process including a first molding step of forming an inner layer portion U-shaped in cross section to clamp a part of the lower edge of the window glass in the thickness direction of the lower edge, and a second molding step of forming an outer layer portion U-shaped in cross section harder than the inner layer portion, outside the inner layer portion, integrally with the inner layer portion, wherein the second molding step includes a step of molding said connecting portion projecting in a direction departing from the lower edge of the window glass, together with the outer layer portion.

Advantageous Effects of Invention

According to the present invention, it is possible to increase the quality and productivity and at the same time to prevent breakage of the window glass caused by attachment of the holder.

DESCRIPTION OF EMBODIMENTS

Hereinafter, with reference to the attached drawings, preferred embodiments of the holder-equipped window glass according to the present invention and the process for its production, will be described.

Figure 1:
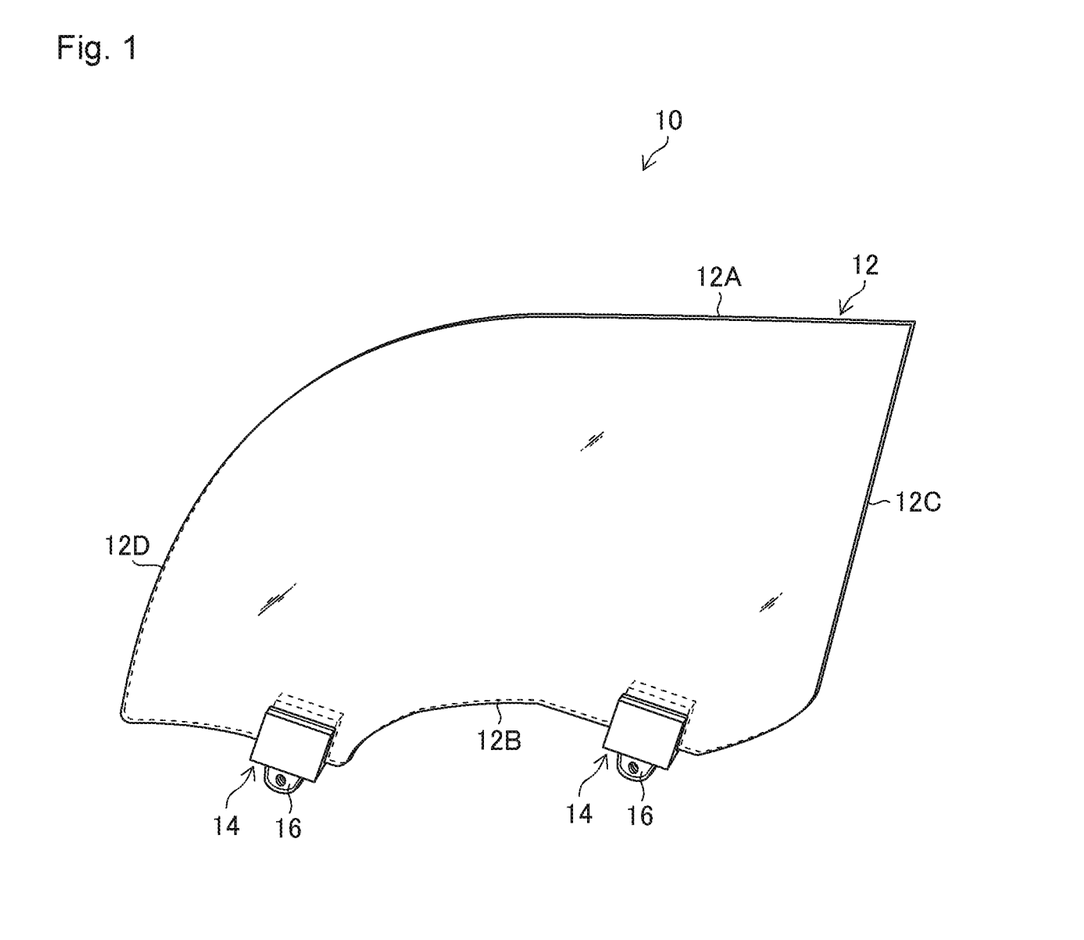
FIG. 1 is a front view of a holder-equipped window glass to be mounted on a vehicle side door to be vertically movable up and down.

A holder-equipped window glass 10 shown in FIG. 1 is mounted on a side door of a vehicle (not shown). This holder-equipped window glass 10 is connected to a lifting and lowering device (not shown) installed inside of a door panel of the side door and will be moved up and down by a driving force from the lifting and lowering device. Thus, the window opening of the side door will be opened and closed by the holder-equipped window glass 10.

In this embodiment, description will be made with reference to a single plate glass as a window glass 12 to constitute a holder-equipped window glass 10. This window glass 12 is made to be in a roughly trapezoidal shape having a roughly horizontal upper edge 12A, a lower edge 12B, a roughly vertical right edge 12C and a circular arc left edge 12D.

The above-mentioned lifting and lowering device is provided with a motor (not shown) and a power transmission member (not shown) such as a link member or a wire to transmit the power of the motor to the holder-equipped window glass. Such a power transmission member is connected to each of connecting portions 16, 16 of a pair of holders 14, 14 attached to parts of the lower edge 12B of the window glass 12.

These holders 14, 14 are members located inside of the door panel and cannot be seen from outside not only at the completely opened time when the holder-equipped window glass 10 has been moved down to the lowest position, but also at the completely closed time when the holder-equipped window glass 10 has been moved up to the highest position. Here, in this embodiment, description will be made with reference to a holder-equipped window glass 10 having two holders 14, 14 attached to the lower edge 12B of a window glass 12.

Figure 2:
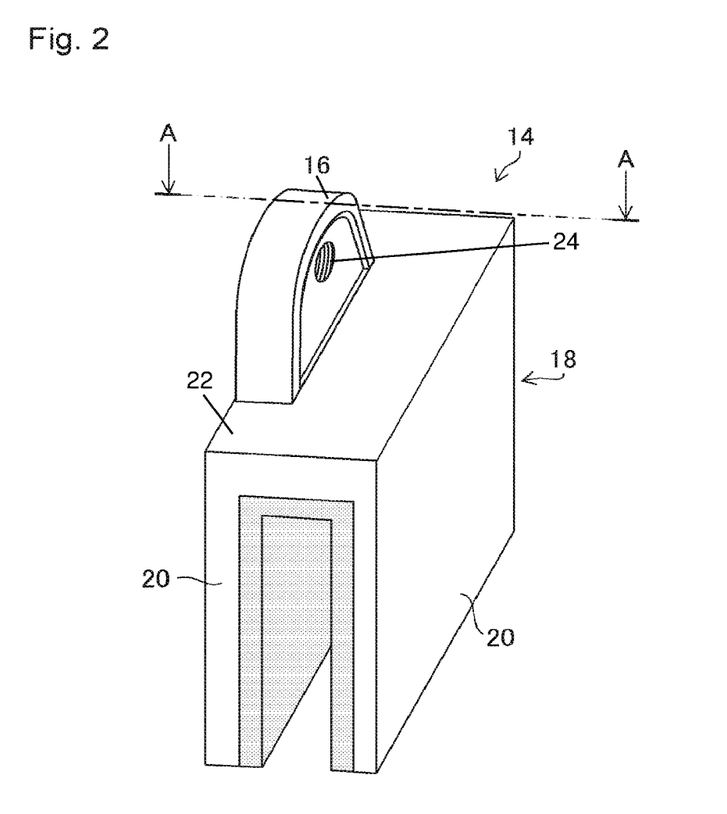
FIG. 2 is an enlarged perspective view showing the outer appearance of a holder.

A holder 14 shown in FIG. 2 includes a holder main body 18 and a connecting portion 16. The holder main body 18 includes a pair of clamping pieces 20, 20 facing each other and a bottom portion 22 connecting the pair of clamping pieces 20, 20. A connecting portion 16 is formed integrally with the bottom portion 22 and at the same time is formed to project to the side opposite to the pair of clamping pieces 20, 20. In this connecting portion 16, a screw hole 24 is provided, and to this screw hole 24, the above-described power transmission member is to be connected. Thus, the power transmission member is connected to the connecting portion 16 of the holder 14.

Figure 3:
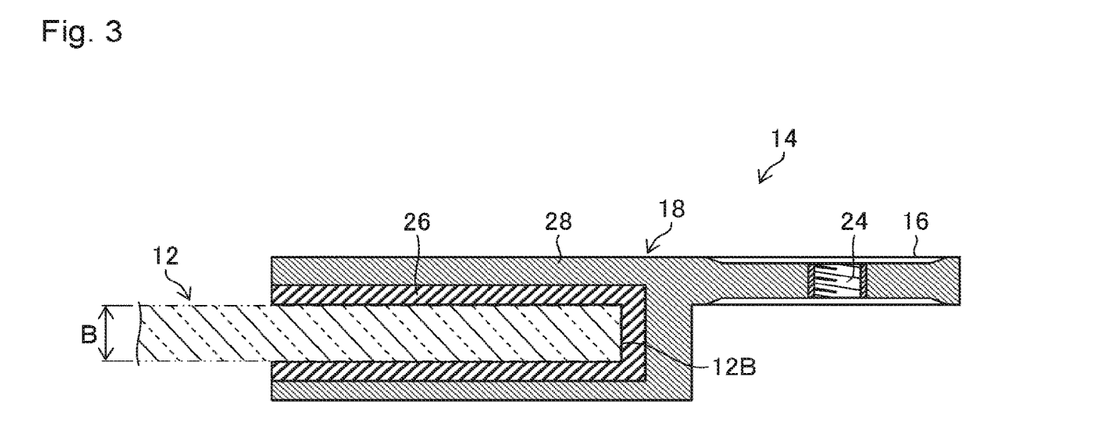
FIG. 3 is a cross-sectional view along line A-A of the holder shown in FIG. 2.

The holder main body 18 shown in FIG. 3 is an integrally molded product including an inner layer portion 26 and an outer layer portion 28. In FIG. 3, the window glass 12 is shown by a two-dot chain line.

The inner layer portion 26 is made to be U-shaped in cross section to clamp a part of the lower edge 12B of the window glass 12 in the thickness direction (in the arrow B direction) of the lower edge 12B. Further, the outer layer portion 28 is located outside the inner layer portion 26, is made of a material harder than the inner layer portion 26 and is constructed to be U-shaped in cross section. This outer layer portion 28 is provided with the connecting portion 16. This connecting portion 16 is, as shown in FIG. 1, projecting in a direction departing from the lower edge 12B of the window glass 12.

The material for the inner layer portion 26 is a thermoplastic elastomer with a low hardness as compared with an engineering plastic such as POM (polyacetal resin) and is a thermoplastic elastomer such as PP (polypropylene resin) or PVC (polyvinyl chloride). As exemplification, the hardness of each of the above materials is such that the Rockwell hardness (R scale) of POM is 120, the Rockwell hardness (A scale) of a thermoplastic elastomer containing PP as the base material (the main material) is from 50 to 95, and the Shore A hardness of PVC is from 60 to 95. Further, in the case of forming an inner layer portion 26, it is preferred to apply a primer to a region where the inner layer portion 26 is to be formed, of the lower edge 12B of the window glass 12, and then form the inner layer portion 26. It is thereby possible to increase the adhesion between the window glass 12 and the inner layer portion 26.

On the other hand, the material for the outer layer portion 28 is a material having a higher hardness and strength than the inner layer portion 26, and a conventional engineering plastic may be selected for use, but it is preferred to select the following resin.

That is, the holder 14 of this embodiment is formed by two-color molding of an inner layer portion 26 and an outer layer portion 28 in order to increase the quality and productivity of the holder-equipped window glass 10. In short, the holder 14 is a two-color molded product formed by two-color molding, wherein the holder 14 is formed by forming the inner layer portion 26, followed by forming the outer layer portion 28 outside the inner layer portion 26. Therefore, as the material for the outer layer portion 28, in consideration of the integral moldability (adhesion) with the inner layer portion 26, it is preferred to select a thermoplastic elastomer having fibers such as glass fibers or carbon fibers incorporated to the same PP or PVC as the material for the inner layer portion 26.

The holder-equipped window glass 10 of this embodiment is an integrally molded product of the window glass 12, the inner layer portion 26 and the outer layer portion 28 of the holder 14 at the lower edge 12B of a window glass 12. Therefore, the holder-equipped window glass 10 can be formed without using the urethane type adhesive. Since no adhesive is used, aging time for curing the adhesive is unnecessary, and there is no fear that the holder 14 peels from the window glass 12 due to deterioration of the adhesive or the like. Furthermore, since no holes are formed in the window glass 12, there is no concern that the window glass 12 will be broken starting from a fine crack formed at the periphery of the hole.

Next, the process for producing a holder-equipped window glass 10 in this embodiment will be described with reference to the flow chart shown in FIG. 4. The production process in this embodiment is a production process by two-color molding wherein a holder 14 is formed by forming an inner layer portion 26 on a window glass 12, followed by forming an outer layer portion 28 outside thereof.

Figure 4:
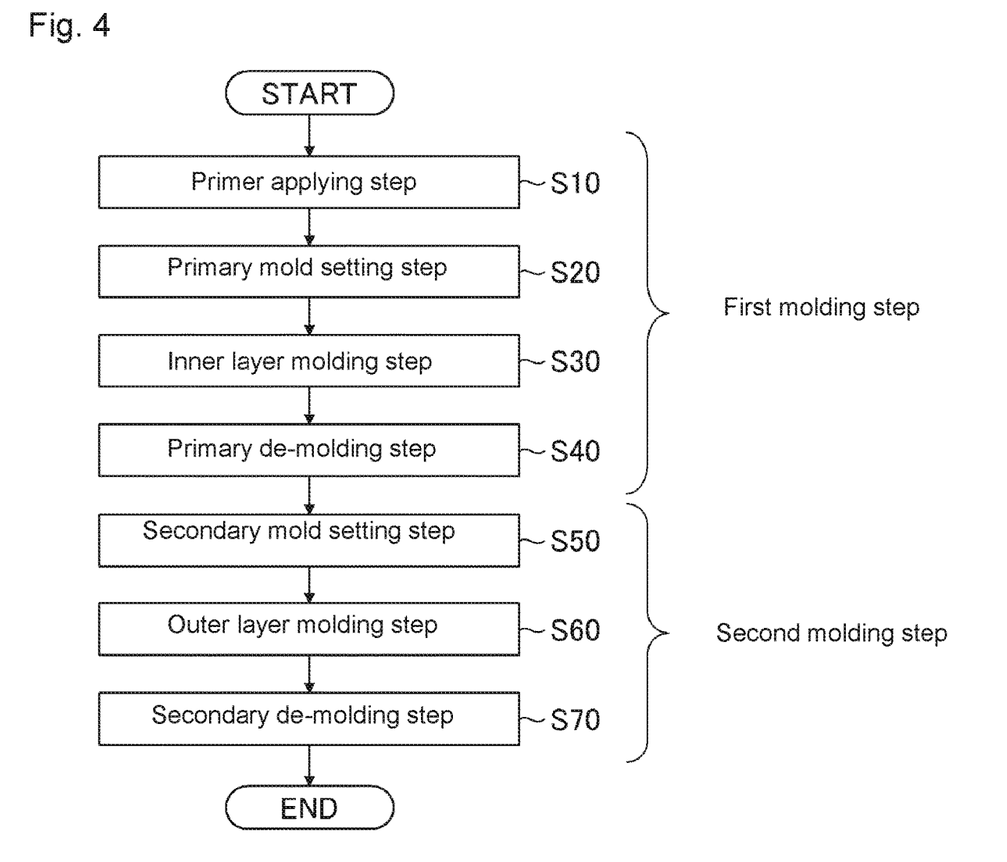
FIG. 4 is a flow chart showing the production process of a holder-equipped window glass in this embodiment.

As shown in FIG. 4, the production process of the present invention includes a first molding step and a second molding step, as largely divided.

The first molding step includes, in the sequential order, a primer applying step (S10), a primary mold setting step (S20) to attach a primary mold for an inner layer portion to a window glass 12, an inner layer molding step (S30) to inject molten PP (may be PVC) into the primary mold, and a primary de-molding step (S40) to dismount the primary mold from the window glass 12.

In the primer applying step (S10), a primer is applied to a region where an inner layer portion 26 is to be formed, of the lower edge 12B of the window glass 12.

Figure 5:
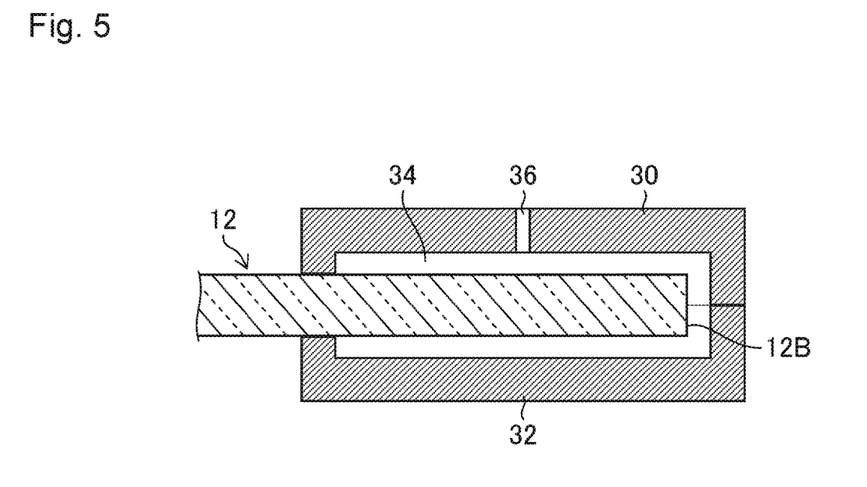
FIG. 5 is a view illustrating the primary mold setting step.

FIG. 5 shows a cross sectional view wherein a pair of molds 30, 32 to constitute the primary mold are set at a position for attaching a holder 14 of a window glass 12. As shown in FIG. 5, a cavity space 34 to form an inner layer portion 26, is formed by the inner wall surfaces of the pair of molds 30, 32, and an injection inlet 36 to inject PP into the cavity space 34 is formed in the mold 30. Here, in FIG. 5, an example is shown wherein the primary mold is constructed by the pair of molds 30, 32, but the construction example of the primary mold is not limited to one shown in FIG. 5.

Figure 6:
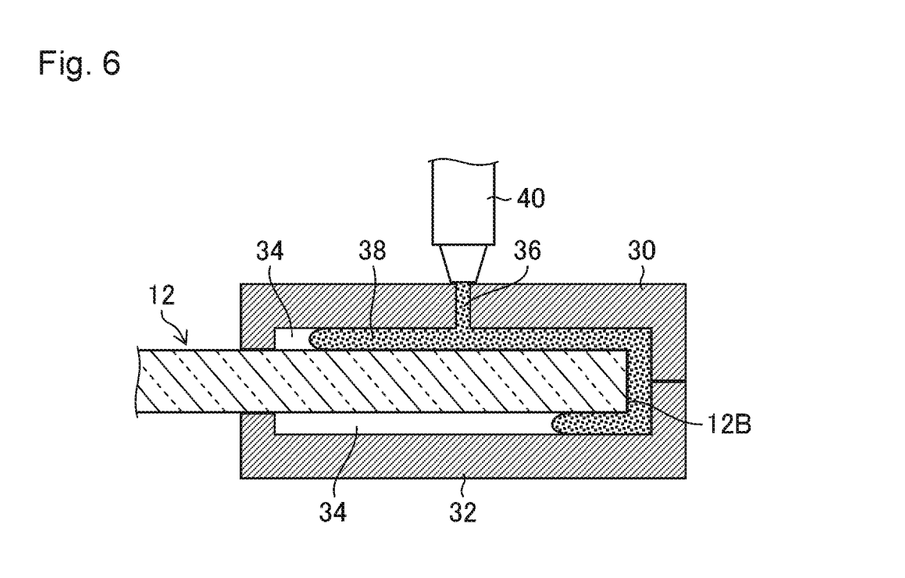
FIG. 6 is a view illustrating the inner layer molding step.

Next, in the inner layer molding step (S30), as shown in the illustration view in FIG. 6, molten PP38 will be injected to the cavity space 34 from an injection inlet 36 by an injection cylinder 40. Thus, an inner layer portion 26 will be formed on a part of the lower edge 12B of the window glass 12. Thereafter, in the primary de-molding step (S40), the molds 30, 32 are dismounted from the window glass 12.

On the other hand, the second molding step includes, in the sequential order, a secondary mold setting step (S50) of attaching a secondary mold for an outer layer portion to the window glass 12, an outer layer molding step (S60) of injecting molten PP (may be PVC) containing 30% of glass fibers, into the secondary mold, and a secondary de-molding step (S70) of dismounting the secondary mold from the window glass 12.

Figure 7:
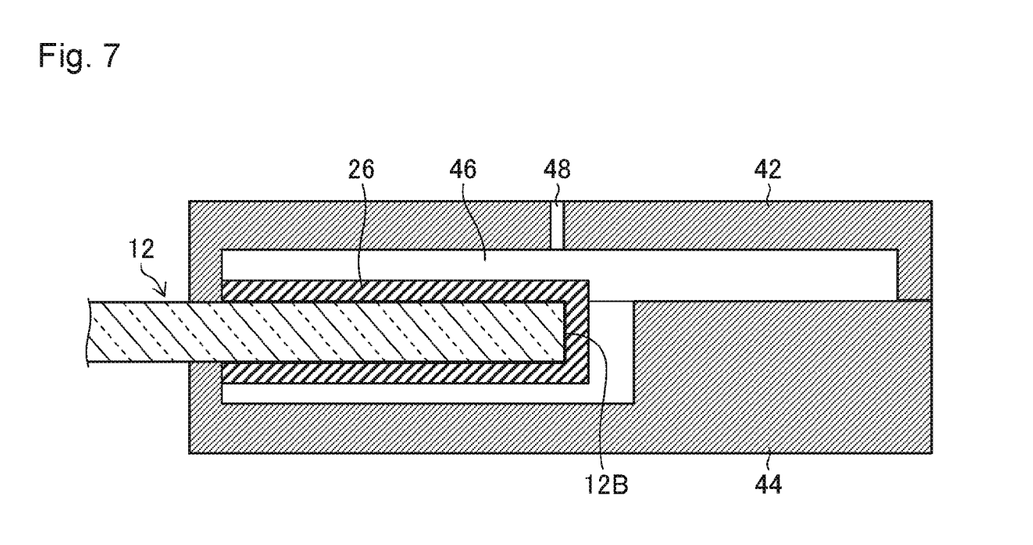
FIG. 7 is a view illustrating the secondary mold setting step.

FIG. 7 shows a cross sectional view wherein a pair of molds 42, 44 to constitute a secondary mold are set a position for attaching a holder 14 of a window glass 12. As shown in FIG. 7, a cavity space 46 to form an outer layer portion 28 is formed by the inner wall surfaces of the pair of molds 42, 44, and an injection inlet 48 to inject PP containing glass fibers into the cavity space, is formed in the mold 42. Here, in FIG. 7, an example is shown wherein the secondary mold is constructed by the pair of molds 42, 44, but the construction example of the secondary mold is not limited to one shown in FIG. 7.

Figure 8:
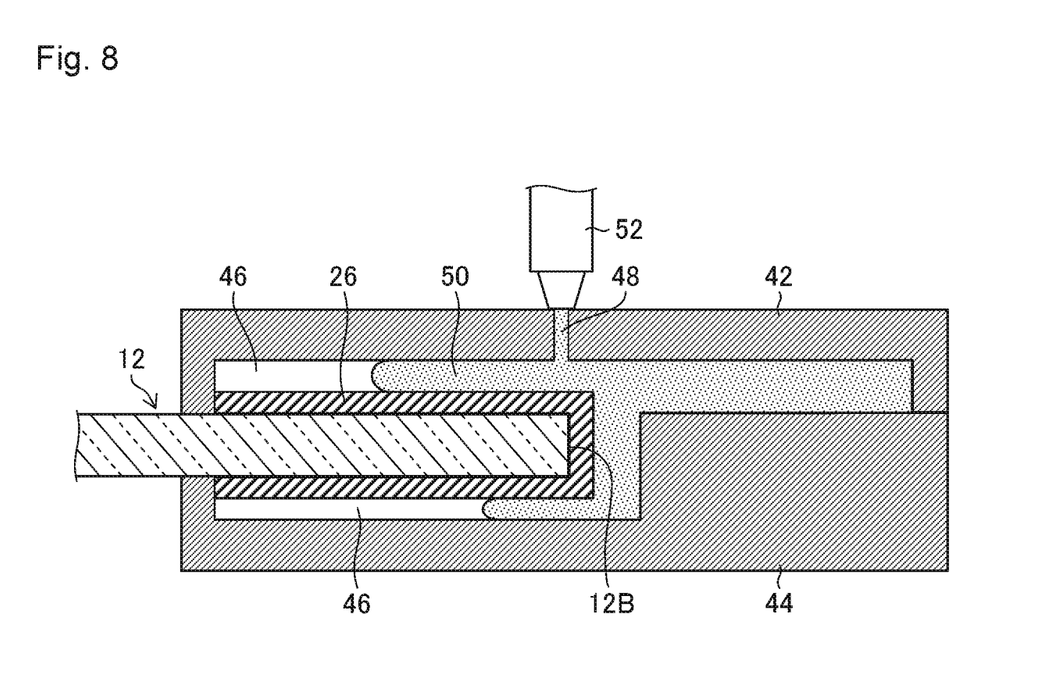
FIG. 8 is a view illustrating the outer layer molding step.

Next, in the outer layer molding step (S60), as shown in the illustration view in FIG. 8, molten PP50 containing 30% of glass fibers, will be injected into the cavity space 46 from an injection inlet 48 by an injection cylinder 52. Thus, an outer layer portion 28 will be integrally formed outside the inner layer portion 26. Thereafter, in the secondary de-molding step (S70), the molds 42, 44 will be dismounted from the window glass 12. Thus, the holder 14 of the two-color molded product including the inner layer portion 26 and the outer layer portion 28 can be formed integrally with the lower edge 12B of the window glass 12.

Here, in the outer layer molding step (S60), it is possible to form, together with the outer layer portion 28, a connecting portion 16 projecting in a direction departing from the lower edge 12B of the window glass 12. The connecting portion 16 and the outer layer portion 28 are formed by the same material with high hardness and strength, whereby it becomes possible to connect them to the lifting and lowering device for the window glass 12. Further, since the connecting portion 16 is formed together with the outer layer portion 28, it is possible to increase the productivity of the holder-equipped window glass 10.

Here, in the outer layer molding step (S60) of this embodiment, PP of the same base material (main material) as the material for the inner layer portion 26, is used, whereby molten PP50 containing 30% of glass fibers will be well heat-fused to the outside of the inner layer portion 26 made of PP. Thus, it is possible to construct a holder 14 having a stabilized shape with high dimensional precision. The above-mentioned content (30%) of glass fibers is one to be set depending upon the hardness required for the outer layer portion 28, and as an example, it is set to be from 30% to 40%. Here, instead of glass fibers, carbon fibers may be incorporated to PP.

Accordingly, by the production process of this embodiment, the window glass 12, the inner layer portion 26, and the outer layer portion 28 of the holder 14 are integrally molded by injection molding at the window glass 12. Further, the production process of this embodiment, the holder 14 is formed by two-color molding, whereby steps S10 to S70 can be carried out in a few minutes. Thus, the holder 14 is possible to be molded integrally with the window glass 12 in a short time. Accordingly, by the production process of this embodiment, as compared with Patent Document 1, it is possible to increase the productivity of a holder-equipped window glass. Further, according to the production process of this embodiment, there is no step for causing such positional displacement of the holder relative to the window glass as in Patent Document 1 requiring an aging time, whereby it is possible to increase the quality of the holder-equipped window glass 10.

Further, the holder 14 of this embodiment is composed of a soft inner layer portion 26 and a hard outer layer portion 28, whereby even if a difference in the expansion degree between the window glass 12 and the outer layer portion 28 is resulted by a difference in the linear expansion coefficient, such a difference may be absorbed as the inner layer portion 26 undergoes elastic deformation. Thus, it is possible to solve a problem caused by the difference in the linear expansion coefficient between the window glass 12 and the outer layer portion 28, i.e. such a problem that the holder 14 is peeled from the window glass 12. Accordingly, by the holder-equipped window glass 10 of this embodiment, it is possible to increase the quality to be higher than the holder-equipped window glass in Patent Document 1.

Further, according to the holder-equipped window glass 10 of the present invention, it does not have a hole to attach a holder like the holder-equipped window glass in Patent Document 2, whereby it is possible to prevent breakage of the window glass 12 to be caused by attachment of the holder 14.

As described above, according to the holder-equipped window glass 10 and the process for its production of this embodiment, it is possible to increase the quality and productivity of the holder-equipped window glass 10 and at the same time, to prevent breakage of the window glass 12 to be caused by attachment of the holder 14.

Further, in the production process of this embodiment, by carrying out the first molding step and the second molding step as follows, it is possible to further shorten the production time for the holder-equipped window glass 10.

That is, in the first molding step, in a preliminary step of the inner layer molding step (S30), the molds 30, 32 are preliminarily heated to the temperature of molten PP38, and then, the inner layer molding step (S30) is carried out. And, immediately after completion of the inner layer molding step (S30), the molds 30, 32 are quenched by a cooling medium. Thus, it is possible to mold the inner layer portion 26 in a short time. Likewise, in the second molding step, in a preliminary step of the outer layer molding step (S60), the molds 42, 44 are preliminarily heated to the temperature of molten PP50 containing 30% of glass fibers, and then, the outer layer molding step (S60) is carried out. And immediately after completion of the outer layer molding step (S60), the molds 42, 44 are quenched by a cooling medium. It is thereby possible to form the outer layer portion 28 in a short time. Thus, by heating and quenching the primary mold and the secondary mold for the predetermined periods of time, it is possible to shorten the time for molding the holder 14. It is thereby possible to further shorten the time for producing the holder-equipped window glass 10.

Here, description was made with respect to a holder-equipped window glass 10 to be applied to a side door, but the application site of the holder-equipped window glass 10 is not limited to a side door. For example, it may be a window glass to be provided on a back door of a vehicle, which is mounted to be vertically movable up and down, on the back door.

Further, in this embodiment, description was made with respect to the holder-equipped window glass 10 having two holders 14, 14 attached to parts of the lower edge 12B of a window glass 12, the number of holder(s) 14 to be attached to the window glass 12 may be one or a plurality of two or more.

Further, in this embodiment, a single plate glass was exemplified as the window glass 12. However, the window glass is not limited thereto, and, for example, a laminated glass may be used.

Further, as the window glass 12, in addition to a non-tempered glass, a tempered glass may be used. The tempered glass may be an air-cooled tempered glass or a chemically tempered glass. In a case where a tempered glass is used for a single plate glass, in order to prevent scattering of glass pieces when broken, a scattering preventive film may be bonded on the surface of the single plate glass. On the other hand, in a case where a tempered glass is used for a laminated glass, the function of the scattering preventive film may be born by a known interlayer, so that the scattering preventive film will not be required. Such an interlayer of the laminated glass may, for example, be a known layer made of e.g. PVB (polyvinyl butyral) or EVA (ethylene vinyl acetate).

The entire disclosure of Japanese Patent Application No. 2017-236133 filed on Dec. 8, 2017 including specification, claims, drawings and summary is incorporated herein by reference in its entirety.

REFERENCE SYMBOLS

10: Holder-equipped window glass, 12: window glass, 12B: lower edge, 14: holder, 16: connecting portion, 18: holder main body, 20: clamping pieces, 22: bottom portion, 24: screw hole, 26: inner layer portion, 28: outer layer portion, 30: mold, 32: mold, 34: cavity space, 36: injection inlet, 38: molten PP, 40: injection cylinder, 42: mold, 44: mold, 46: cavity space, 48: injection inlet, 50: molten PP (molten PP containing 30% of glass fibers), 52: injection cylinder

What is claimed is:

1. A holder-equipped window glass comprising:
   a window glass mounted on a vehicle door so as to be vertically movable up and down; and
   a holder attached to a part of a lower edge of the window glass and having a connecting portion to be connected to a lifting and lowering device for the window glass, wherein
   said holder is an integrally molded product comprising an inner layer portion and an outer layer portion,
   said inner layer portion is U-shaped in cross-section to clamp a part of the lower edge of the window glass in a thickness direction of the lower edge,
   said outer layer portion is located outside said inner layer portion, is made of a material harder than said inner layer portion, and is U-shaped in cross section,
   said outer layer portion has said connecting portion projecting in a direction departing from the lower edge of the window glass, and
   said inner layer portion of the holder is made of a thermoplastic elastomer, and said outer layer portion is made of a thermoplastic elastomer containing fibers,
   wherein the holder-equipped window glass is an integrally molded product of the window glass and the holder.

2. The holder-equipped window glass according to claim 1, wherein said window glass is a single plate glass or a laminated glass.

3. The holder-equipped window glass according to claim 1, wherein said holder is a two-color molded product comprising said inner layer portion and said outer layer portion, wherein the two-color molded product is formed by two-color molding in which the inner layer portion is formed and subsequently the outer layer portion is formed outside the inner layer portion.

4. The holder-equipped window glass of claim 1, wherein a primer is applied between the window glass and the inner layer portion.

5. The holder-equipped window glass of claim 1, wherein the connecting portion has a screw hole provided therein, and the screw hole is configured to connect to a power transmission member.

6. A process for producing a holder-equipped window glass comprising a window glass mounted on a vehicle door so as to be vertically movable up and down, and a holder attached to a part of a lower edge of the window glass and having a connecting portion to be connected to a lifting and lowering device for the window glass, said process comprising:
   a first molding step of forming an inner layer portion by injection molding a molten thermoplastic elastomer into a primary mold, wherein the inner layer portion is U-shaped in cross section to clamp a part of the lower edge of the window glass in a thickness direction of the lower edge; and
   after the first molding step, a second molding step of forming an outer layer portion by injection molding a molten thermoplastic elastomer containing fibers into a secondary mold, wherein the outer layer portion is U-shaped in cross section and harder than the inner layer portion, wherein the outer layer portion is formed outside the inner layer portion and integrally with the inner layer portion, wherein the second molding step includes a step of molding said connecting portion projecting in a direction departing from the lower edge of the window glass, together with the outer layer portion, wherein the second molding step is after the first molding step.

7. The process of claim 6, wherein the inner layer portion and the outer layer portion are integrally molded as a two-color molded product, wherein the two-color molded product is formed by two-color molding in which the inner layer portion is formed and subsequently the outer layer portion is formed outside the inner layer portion.

8. The process of claim 6, further comprising a primer-applying step that comprises applying a primer to a region where the inner layer portion is to be formed along the lower edge of the window glass, wherein the primer-applying step is before the first molding step.

* * * * *